Nov. 29, 1932. J. PAVLECKA 1,889,262
INDUCTION SYSTEM FOR INTERNAL COMBUSTION ENGINES
Filed Dec. 31, 1928 2 Sheets-Sheet 1
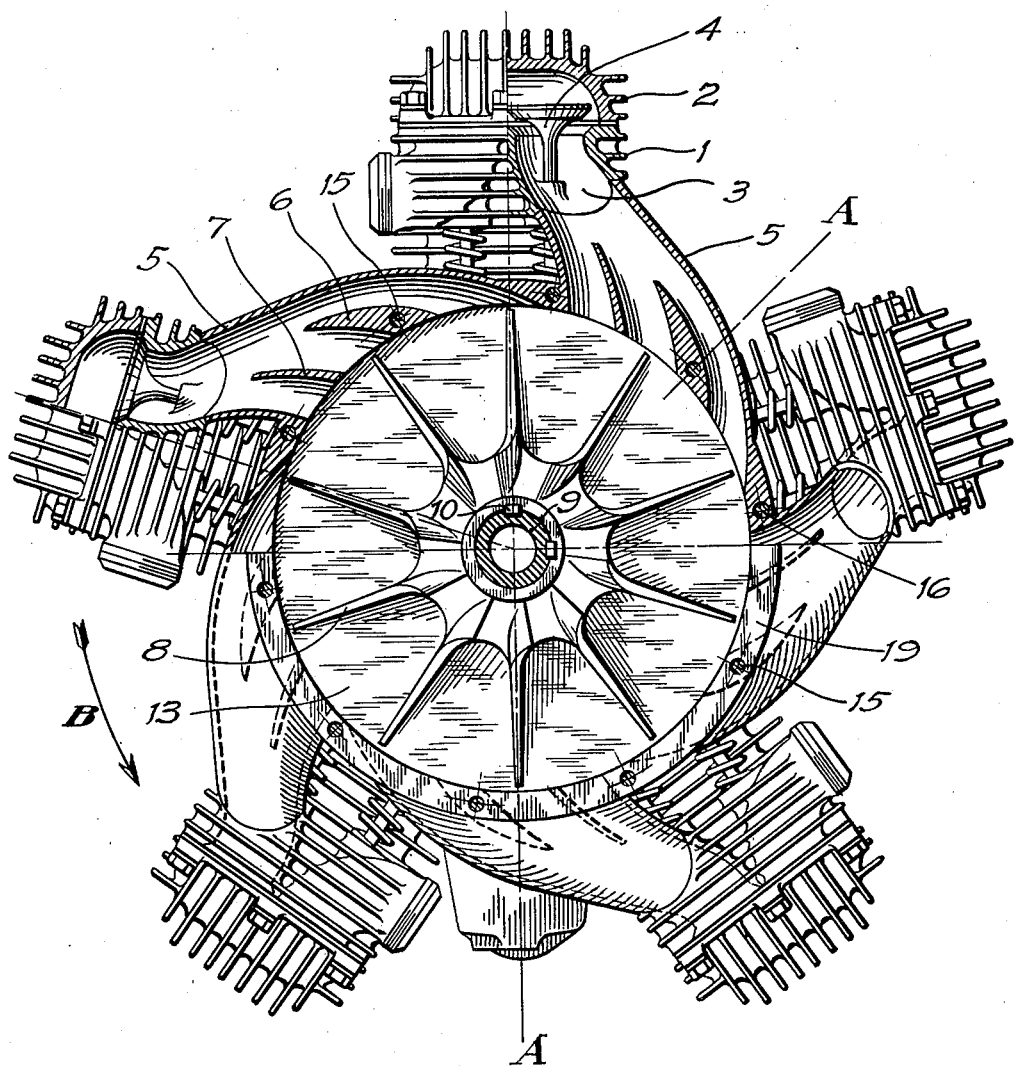
INVENTOR.

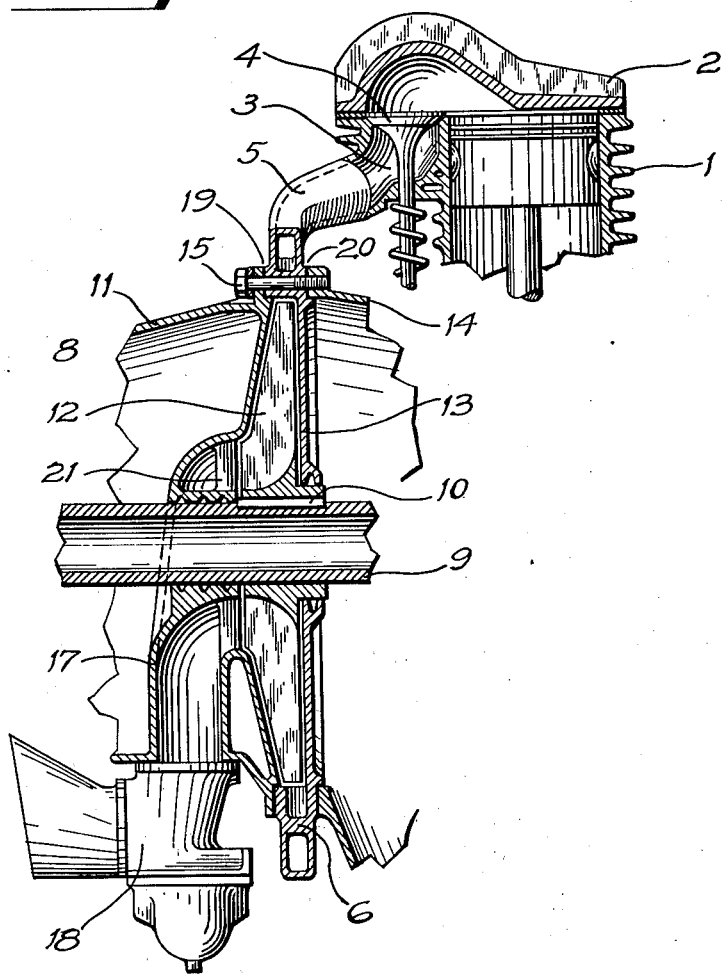

Patented Nov. 29, 1932

1,889,262

UNITED STATES PATENT OFFICE

JAN PAVLECKA, OF WYANDOTTE, MICHIGAN

INDUCTION SYSTEM FOR INTERNAL COMBUSTION ENGINES

Application filed December 31, 1928. Serial No. 329,585.

My invention relates to internal combustion engines in general, and to an induction system for radial engines in particular.

For proper induction of the explosive mixture into the cylinders of radial engines, particularly those used in aircraft, rotary blowers or superchargers have recently been resorted to, for the reason that the impeller of a blower not only distributes the mixture evenly into all the cylinders and effects thorough atomization of the fuel in the mixture, but if of a large diameter or if geared up in speed, the impeller increases to a certain extent the volume of the mixture fed into the cylinders above that which suction only would induce. The means for conveying the accelerated mixture from the impeller into the cylinders—hereinafter referred to as the induction system—consists invariably of a number of plain round pipes set either radially or, at best, at an angle to the periphery of the impeller.

It can easily be recognized that the several apertures, usually round, for the induction pipes in the periphery of the impeller casing are in no coordination with the character of the flow of the mixture ejected centrifugally from the impeller, neither can the round pipes conduct the mixture in such a manner as to utilize its velocity for increasing the pressure thereof to any great extent and thereby deliver an abnormal volume into the cylinders. Due to the fact that the entrance aperture of the induction pipes is concentrated in extent, the portion of the impeller periphery spanned thereby is relatively small in consequence of which most of the velocity of the mixture acquired in the impeller is wasted before the mixture finds its way into the induction pipes; once in the pipes, the flow of the mixture is disrupted and becomes turbulent, negativing most of the supercharging effect of the impeller.

The above deficiency, common to all radial engines, has been an incentive for me to devise the new and efficient induction system disclosed hereinafter in principle as well as in structural detail.

As one of its objects my invention has to devise an induction system for radial engines which is so formed as to utilize the velocity of impelled mixture to the highest degree and thus materially and substantially increase the volumetric efficiency of the cylinders above that feasible with the customary induction pipes.

A further object of my invention is to provide a manifold for radial engines which will utilize most efficiently the velocity of the mixture issuing from a rotary impeller, and will feed it into the cylinders in a manner conforming ideally to the forced flow of said mixture.

A further object of my invention is to provide an induction system for radial engines which will be characterized by such structural features as to make it practicable to employ an impeller of a relatively large diameter.

A further object is to provide an induction system for radial engines which employs an impeller of such large diameter, and has the induction ducts formed so as to convert the velocity of the mixture into pressure with the greatest efficiency, whereby the impeller does not have to be geared up to secure the effect which normally only high speed and mechanically complicated superchargers can afford.

An object of importance is to present a mechanical elaboration of the problem of adapting an impeller, together with the new induction system, to radial engines in a neat and structurally simple manner.

Further novel results and desirable features of the new induction system of my invention will be apparent from the disclosure of the principle and the structural solution of the problem set forth hereinabove.

The induction system of my invention comprises essentially a rotary impeller in combination with as many induction ducts as there are cylinders, the ducts being formed so as to embrace together the whole circumference of the impeller, and cross-sectionally shaped so as to receive the airflow from the impeller in its natural path and with as little obstruction as practicable, and to gradually guide the airflow without abrupt changes in direction to the engine valve along a substantially involute course; pursuing this course, the airflow will be utilized to the greatest extent to fill the cylinders in excess of their normal charge.

While the area of the induction ducts remains approximately constant throughout the extent thereof from the periphery of the impeller to the valve port, the cross-sectional form is varied in such manner that the angular extent of the duct at the impeller periphery is the largest possible and amounts to fully that fraction of the periphery given by the total number of cylinders to be supplied therefrom; the width dimension of the duct at the periphery corresponds closely to the width dimension of the impeller vanes at their tip, and the latter being relatively small as provided by the law of the relation between velocity and area of passage, the duct is narrow likewise. From the periphery of the impeller the induction duct recedes in the angular direction given by the resultant of the normal and the tangential component of the velocity of the mixture leaving the impeller, the direction being generally concomitant with the direction of rotation of the impeller, and the outward course of the duct is preferably given by an involute generated from the periphery of the impeller as the base circle. The cross-sectional form of the duct, as it recedes angularly and outwardly away from the impeller, is made to gradually increase in the width dimension and retract in the angular span until it becomes approximately or plainly circular at the exit portion thereof whereat it is conjoined to the valve port of the cylinder.

The mixture issuing from the impeller at high velocity in the direction generally concurrent with that of the rotation of the impeller, will enter the induction duct readily wherever it leaves the impeller, and its velocity will be preserved in value and in direction as it progresses outwardly and angularly along the streamline walls of the duct and as it is deflected laterally to the valve port and finally discharged smoothly thereinto; inasmuch as the inflow of the mixture to the valve chamber is continuous and uniform, while the valve opens intermittently, the mixture will be checked in velocity while the valve is closed, and as a result, the velocity of the mixture will be converted into static pressure for the closed period of the valve, so that a superabundant amount of mixture is in readiness in the duct to be injected into the cylinder as soon as the valve opens; when this occurs, the accumulated volume of mixture is readily accelerated due to the suction of the piston and especially due to the velocity of the still incoming mixture; this process of course repeats itself with rapidity which makes the surging of the mixture into the engine cylinder a continuous pulsating flow.

A structural elaboration of the above disclosed principle of the present invention will now be described with reference to the drawings accompanying this specification as an integral part thereof. In the drawings, Figure 1 represents an axial view of a radial engine embodying my invention; the top portion of the view is a cross-section through the induction ducts of the engine on the median line through the cross-sectional area of the ducts; the bottom portion of Fig. 1 is an exterior view of the induction ducts; the view being taken with the casing removed so as to fully expose the impeller; and Fig. 2 is a longitudinal cross-section through the engine on the line A—A of Fig. 1.

Referring jointly to Figs. 1 and 2, the engine represented therein comprises a number of cylinders 1 arranged radially about a crank-shaft 9, and each having a head 2, an intake ante-chamber 3, and an intake valve 4 which alternately opens and closes the passage from the chamber 3 into the head 2. The valve 4 is shown as being on the side of the cylinder 1, and the head 2 as having an L-head form, which, of course, is only for purposes of illustration, and any other form of head and valve location can be substituted for those shown. To the valve chamber 3 an induction duct 5 is conjoined so as to form a smooth passage thereinto.

The duct 5 is characterized by the particular configuration of its cross-sectional form and its course throughout its extent; structurally, the duct 5 forms an integral part of a casing composed of all the ducts 5 equally spaced angularly about an impeller 12. The impeller 12 is mounted, as by means of key 10, on a driven shaft 9, which in this instance is assumed to be the crankshaft itself; the impeller 12 comprises a number of radial vanes having an entrance and an exit edge and tapering outwardly in width and in thickness between said entrance and said exit edges.

Referring now specifically to Fig. 2, the casing comprising the ducts 5 is shown as being integral with a transverse diaphragm 13 which provides one wall of the housing for the impeller 12; the other wall is integral with a separate casing 11 and with a conduit 17 which leads from a carburetor 18 to the impeller 12 and forms an annular port around the shaft 9 for uniform distribution of the mixture into the entrance of said impeller. In the exit of the conduit 17, facing the impeller 12, there is a plurality of guide vanes 21 for directing the mixture into the impeller with an initial angle of whirl.

The cylinders 1, of which five are shown by way of example, have each an individual duct 5 communicating between the impeller 12 and the intake chamber 3. All five—or any other number—of the ducts 5 are all alike and together fully embrace the impeller periphery, each subtending an equal portion thereof.

The portion of the impeller periphery pertaining to any one of the cylinders is located so as to be offset with relation to the cylinder in the direction opposite to that of the rotation of the impeller 12 which is indicated by an arrow B in Fig. 1. The peripheral cross-section of the duct 5, being only of the width of the impeller housing at the impeller tips, is relatively narrow but greatly extended in the angular dimension, and constitutes the entrance into the duct 5; from the periphery of the impeller 12 the cross-section of the duct 5 gradually becomes more and more compact as the width thereof increases while the angular spread decreases, the duct at the same time retrogressing from the impeller periphery angularly and outwardly, the median line as well as the extreme profile curves thereof following approximately involute courses, and laterally aiming at the intake chamber 3. At this chamber, the duct 5 assumes a cross-sectional form corresponding to that of the valve port and is conjoined thereto in any suitable manner along the parting line indicated in both figures.

In addition to the streamline and aerofirmous configuration of the walls of the induction duct, 5, further means in the form of guide vanes are made use of to direct the airflow in a smooth fashion so as to prevent eddying of the mixture as it enters the duct 5 and proceeds from one cross-section thereof to another. Two guide vanes 6 and 7 are shown in Fig. 1 disposed transversely between the front and aft walls of the duct 5 at approximately equal angular spaces; the vanes originate at the very periphery of the impeller 8 and therefrom extend outwardly and angularly following the involute path of the duct, and terminate with trailing edges at a distance commensurate with their functional and structural purpose. The number of the vanes is determined by structural conditions in individual cases and can be anything more or less than the number shown.

While it is customary practice in more refined designs to employ guide or diffusion vanes for directing the mixture as it leaves the impeller, such vanes are always located between the impeller and the induction pipes, thereby necessitating a considerable reduction in the diameter of the impeller in order that they may be accommodated. It is apparent that in my invention no special diffusion vanes are required as the vanes 6 and 7 in the induction duct 5 proper fully serve the purpose, and the impeller can be increased in diameter to the full extent of the induction casing; the relatively large diameter of the impeller has for its immediate result that the impeller need not be geared up in speed as the peripheral velocity thereof, especially in conjunction with the most efficient utilization of the velocity of the mixture in the ducts 5, is sufficient to provide the effect of a high speed impeller without any mechanical complications and excess weight.

Not only do the vanes 6 and 7 solve the problem of adapting the induction casing so that a large impeller can be employed, but moreover, they furnish a feature of outstanding novelty in the manner whereby they make it possible to include the induction casing, comprising the ducts 5 and the diaphragm 13, into the engine assembly without detracting anything from the diameter of the impeller or from the angular extent or from the efficiency of the induction ducts 5 due to the fact that tying means, such as bolts, have to be passed through the induction casing at or near the periphery of the impeller 12.

The induction casing 26 is provided with radial flanges 19 and 20 on the front and the rear faces thereof respectively; by means of these flanges the casing is secured in between the adjacent casings 11 and 14 of the engine. The casings 11 and 14 are tied together by means of a plurality of bolts 15 and 16. In order to insure that the said bolts will not constitute obstructions in the ducts 5, and furthermore, that they will not limit the angular extent of said ducts, their spacing is arranged so that at least one half of their number will coincide with either of the vanes 6 or 7 in the ducts 5, and will pass therethrough without in any way interfering with the flow in said ducts; moreover, the vanes 6, accommodating the bolt 15 therethrough, serves also as a spacer between the flanges 19 and 20 and thus relieves the walls of the duct 5 of any strain from said bolts. The alternate bolts 16 are disposed equi-distantly to the bolts 15 in such a manner that they coincide with the point of division of the impeller periphery between each two adjacent ducts 5; due to the fact that the involute contours of the said two ducts diverge from each other as they proceed from the impeller periphery outwardly, a vacant spot is left between said ducts which is large enough to accommodate a bolt 16 therethrough within the flanges 19 and 20, without affecting either of the two ducts.

The bolts 15 and 16 need not of course be spaced evenly as in this case, as different conditions in other embodiments may call for different disposition thereof; also any other modifications and adaptations departing from the embodiment shown as illustrative are at the liberty of those who make use of the present invention in their particular cases, all of such departures will obviously be considered as falling within the scope of the claims appended hereinbelow.

What I claim is:—

1. In combination with a series of radially disposed cylinders, an impeller housing, and a rotatable impeller therein, of a series of ducts extending from said housing to said cylinders, each of said ducts having an entrance aperture angularly spanning that fraction of the periphery of said impeller which pertains to one cylinder, and at said periphery having a width substantially equal to that of said impeller thereat, and thence diminishing gradually in angular span and increasing in width from its entrance aperture toward the intake port of the associated cylinder.

2. In combination with a series of radially disposed cylinders, an impeller housing, and a rotatable impeller therein, of a series of ducts extending from said housing to said cylinders, each of said ducts having a relatively narrow and angularly extended entrance aperture at the periphery of said impeller and thence proceeding outwardly and angularly to one of said cylinders and gradually increasing in the width dimension and decreasing in angular span until terminating at said cylinder with an approximately circular exit aperture.

3. In combination with a series of radially disposed cylinders, an impeller housing, and a rotatable impeller therein, of a series of ducts extending from said housing to said cylinders, each of said ducts having a substantially rectangular entrance aperture at the periphery of said impeller of a width substantially equal to that of said impeller thereat, and angularly spanning that fraction of said periphery which pertains to one cylinder, and thence proceeding outwardly and angularly to one of said cylinders and gradually increasing in the width dimension and decreasing in angular span until terminating at said cylinder with an approximately circular exit aperture.

4. In combination with a series of radially disposed cylinders, an impeller housing, and a rotatable impeller therein, of a series of ducts extending from said housing to said cylinders, said ducts having relatively narrow inlet apertures together embracing the whole periphery of said impeller, and thence proceeding each to one of said cylinders with the profile counters thereof following converging curvatures and the width increasing in direct proportion.

5. In combination with a series of radially disposed cylinders, an impeller housing, and a rotatable impeller therein, of a series of ducts extending from said housing to said cylinders, each of said ducts having a relatively narrow and angularly extended entrance aperture at the periphery of said impeller, and thence proceeding outwardly and angularly to one of said cylinders with the profile contours thereof following substantially involute converging curvatures and terminating at said cylinder with a substantially circular exit aperture, the area of passage throughout said duct remaining approximately constant.

6. In combination with a series of radially disposed cylinders, an impeller housing, and a rotatable impeller therein, of a series of ducts extending from said housing to said cylinders, each of said ducts having a substantially rectangular entrance aperture at the periphery of said impeller of a width substantially equal to that of said impeller thereat, and a substantially circular exit aperture at one of said cylinders, said exit aperture being angularly offset with respect to said entrance aperture in the direction of rotation of said impeller, the profile contours of said duct following substantially involute converging curvatures between said apertures thereof while the width dimension increases concomitantly, maintaining an approximately constant passage area throughout.

7. In combination with a series of radially disposed cylinders, an impeller housing, and a rotatable impeller therein, of a series of ducts extending between said housing and said cylinders, said ducts together embracing the whole periphery of said impeller and at said periphery having a width substantially equal to that of said impeller thereat, and thence proceeding outwardly and angularly and laterally toward one of said cylinders, the profile contours of said duct following substantially involute converging curvatures and the width dimension showing a concomitant increase as maintaining an approximately constant passage area throughout said outward, angular and lateral course thereof.

8. In combination with a series of radially disposed cylinders, an impeller housing, and a rotatable impeller therein, of a series of ducts extending from said housing to said cylinders and each having a relatively narrow and angularly extended entrance aperture at the periphery of said impeller, and a plurality of vanes disposed transversely in said ducts at said entrance apertures thereof and extending outwardly therefrom following substantially intermediate courses between the profile contours of said ducts.

9. In combination with a series of radially disposed cylinders, an impeller housing, and a rotatable impeller therein, of a series of ducts extending from said housing outwardly and angularly to said cylinders along gradually converging profile curvatures and each having a substantially rectangular entrance aperture at the periphery of said impeller and of a width substantially equal to that of said impeller at its periphery, and a plurality of approximately equidistant vanes disposed transversely between the lateral walls of said ducts at said entrance aperture thereof and therefrom extending outwardly following substantially intermediate courses between the converging contours of said ducts and terminating with trailing edges at a distance from said entrance apertures.

10. The combination of a series of radially disposed cylinders, an impeller housing, a rotatable impeller therein, a series of induction ducts extending from said housing to said cylinders, said ducts having relatively narrow and angularly extended entrance apertures together embracing the periphery of said impeller, and thence each of said ducts receding outwardly and angularly in the direction given approximately by the discharge from said impeller, and thereafter proceeding toward the associated cylinder and registering therewith through a relatively compact exit aperture; and a vane or vanes in each of said ducts in the entrance portion thereof, said vane or vanes being positioned transversely between the lateral walls of said duct and made to follow approximately intermediate paths between the sides thereof whereby providing means for smooth entry of the discharge from said impeller into said duct, means for spacing the lateral walls of said duct and means for passing bolts through said impeller housing for the assembly and attachment thereof.

In testimony whereof I affix my signature.

JAN PAVLECKA.